(12) United States Patent
Lee et al.

(10) Patent No.: US 11,215,337 B2
(45) Date of Patent: Jan. 4, 2022

(54) PUDDLE LAMP

(71) Applicant: Young Optics Inc., Hsinchu (TW)

(72) Inventors: Chia-Yun Lee, Hsinchu (TW); S-Wei Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 16/916,172

(22) Filed: Jun. 30, 2020

(65) Prior Publication Data

US 2021/0140603 A1 May 13, 2021

(30) Foreign Application Priority Data

Nov. 13, 2019 (TW) .................................. 108141089

(51) Int. Cl.
| | |
|---|---|
| *F21S 43/20* | (2018.01) |
| *B60Q 1/32* | (2006.01) |
| *G03B 21/20* | (2006.01) |
| *F21W 107/00* | (2018.01) |

(52) U.S. Cl.
CPC ................ *F21S 43/26* (2018.01); *B60Q 1/32* (2013.01); *G03B 21/208* (2013.01); *B60Q 2400/40* (2013.01); *F21W 2107/00* (2018.01)

(58) Field of Classification Search
CPC ... F21S 43/26; B60Q 1/0041; B60Q 2400/40; G03B 21/208; F21W 2107/00
See application file for complete search history.

(56) References Cited

U.S. PATENT DOCUMENTS

| | | | | |
|---|---|---|---|---|
| 8,007,133 | B2* | 8/2011 | Yamauchi | G03B 21/2033 |
| | | | | 362/277 |
| 9,686,517 | B2* | 6/2017 | Yu | H04N 9/3105 |
| 2016/0356444 | A1* | 12/2016 | Ohno | F21S 41/145 |
| 2019/0270403 | A1* | 9/2019 | Sobecki | G02B 7/021 |
| 2019/0324362 | A1* | 10/2019 | Favero | B60Q 1/323 |
| 2019/0368689 | A1* | 12/2019 | Rotzer | F21S 43/26 |
| 2020/0088379 | A1* | 3/2020 | Kurashige | G02B 5/1842 |
| 2020/0173625 | A1* | 6/2020 | Meier | F21S 43/26 |
| 2020/0183328 | A1* | 6/2020 | Studeny | B60Q 1/302 |
| 2020/0290516 | A1* | 9/2020 | Messenger | B60Q 1/24 |

* cited by examiner

*Primary Examiner* — Bryon T Gyllstrom
*Assistant Examiner* — Christopher E Dunay
(74) *Attorney, Agent, or Firm* — JCIPRNET

(57) ABSTRACT

A puddle lamp including a light source composed of a single light emitting body, a lens set, a projection film with a fixed image and a projection lens is provided. The lens set is disposed at a light path downstream side of the light source. The projection film is disposed at a light path downstream side of the lens set. The lens is disposed at a light path downstream side of the projection film. An optical axis of the light source is substantially parallel to an optical axis of the lens set, and an optical axis of the projection lens is not perpendicular to an image plane of the puddle lamp. Furthermore, another puddle lamp is also provided.

20 Claims, 5 Drawing Sheets

PUDDLE LAMP

CROSS-REFERENCE TO RELATED APPLICATION

This application claims the priority benefit of Taiwan application serial no. 108141089, filed on Nov. 13, 2019. The entirety of the above-mentioned patent application is hereby incorporated by reference herein and made a part of this specification.

BACKGROUND

Technical Field

The disclosure relates to a projector, and particularly, relates to a puddle lamp.

Description of Related Art

A puddle lamp (which is also referred to as a ground lamp) is used as auxiliary lighting, and may be used for ground lighting or road lighting under low ambient light. For example, a puddle lamp used in a vehicle is usually installed at a door or a rear view mirror, etc. For example, when the door is opened, the puddle lamp turns on an illumination function and projects an image on the ground, which not only produces unique and dazzling image light and a projection image, but also provides a function of illuminating the ground when opening the door under the low ambient light at night, such that those who get on or off the car may notice the ground conditions without accidentally stepping on dirt, puddles, or other dangerous terrain on the ground. However, since the puddle lamp usually projects the image to the ground in an oblique manner, the brightness of a partial image closer to the puddle lamp is higher, and the brightness of a partial image farther away from the puddle lamp is lower, and the distance asymmetry between the puddle lamp and the ground causes uneven image brightness.

SUMMARY

An embodiment of the invention is directed to a puddle lamp, which is adapted to project an image with uniform brightness.

An embodiment of the invention provides a puddle lamp including a light source composed of a single light-emitting body, a lens set, a projection film and a projection lens. The lens set is disposed at a light path downstream side of the light source, the projection film is disposed at a light path downstream side of the lens set, and the projection lens is disposed at a light path downstream side of the projection film.

In an embodiment, the lens set and the projection lens are optically coaxial, but a light source optical axis shifts from the optical axis of the lens set and the projection lens by a non-zero offset in the direction perpendicular to the optical axis.

In an embodiment, the lens set and the projection lens are optically coaxial, but a light source optical axis is tilted relative to the optical axis of the lens set and the projection lens.

In an embodiment, the light source and the lens set are optically coaxial, but the optical axis of the light source and the lens set is tilted relative to a projection lens optical axis.

Based on the above description, in the puddle lamp of the embodiments of the invention, through the offset or tilt design, geometric asymmetry is introduced into the puddle lamp to cause optical asymmetry to balance the distance asymmetry between the puddle lamp and the ground, so that the puddle lamp may project an image with a uniform brightness.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
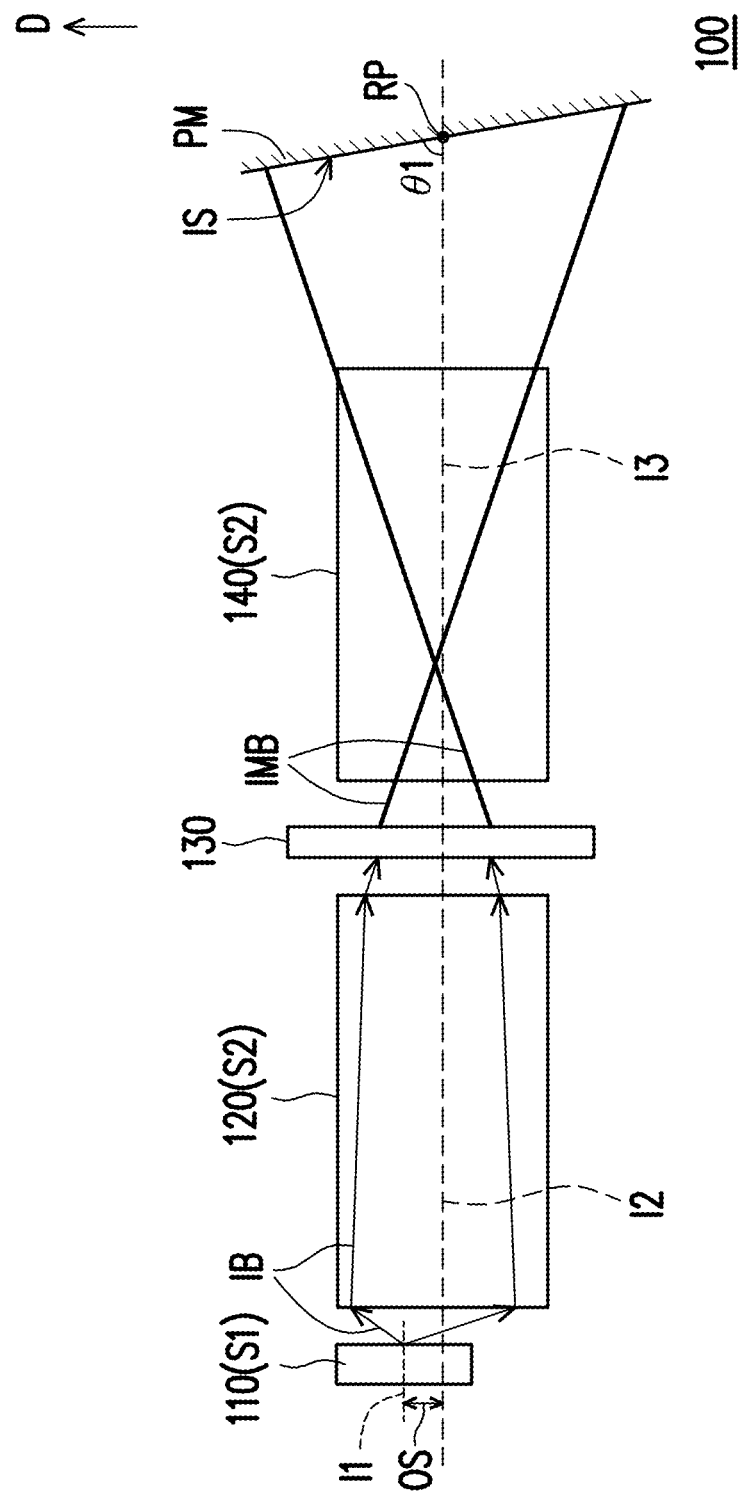
FIG. 1 to FIG. 3 are schematic diagrams of puddle lamps according to different embodiments of the invention.
Figure 2:
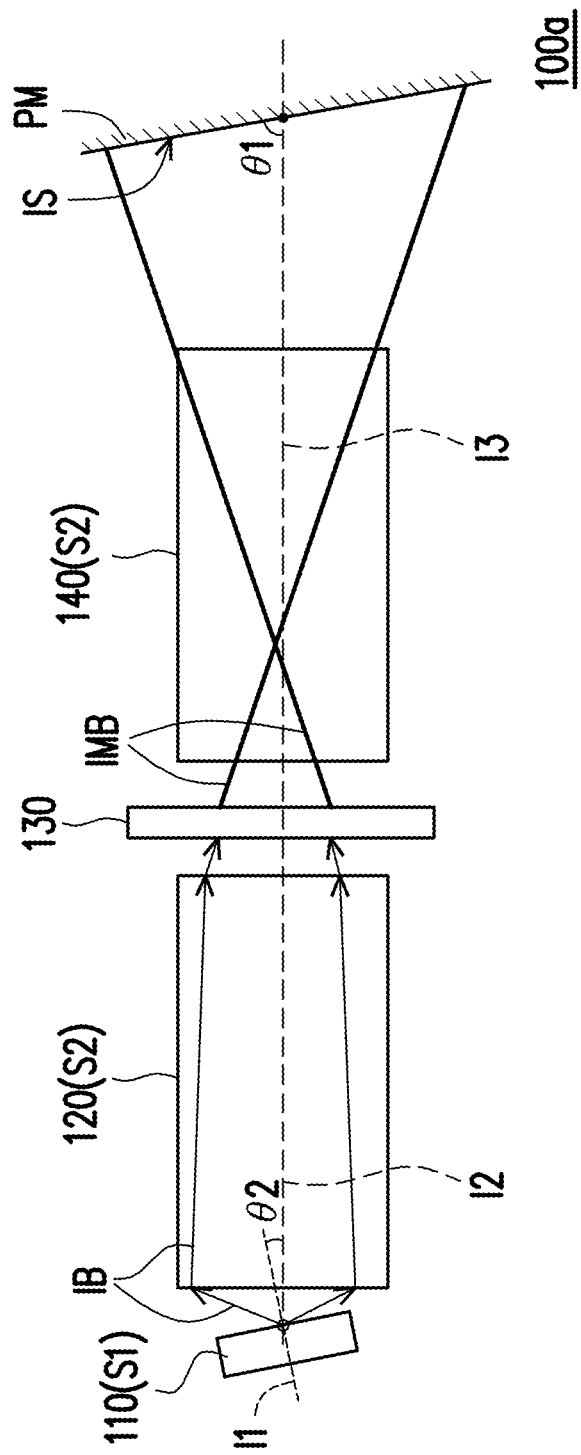
Figure 3:
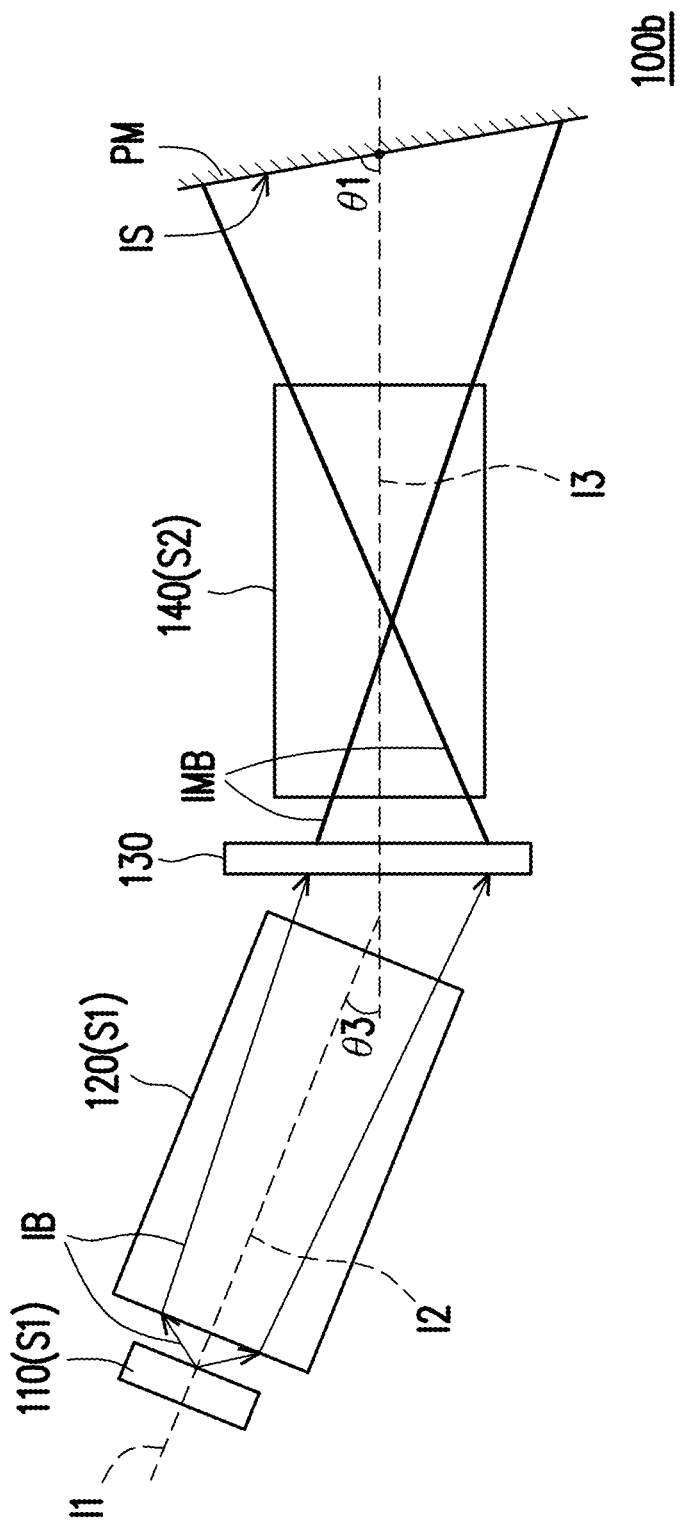

FIG. 1 to FIG. 3 are schematic diagrams of puddle lamps according to different embodiments of the invention.

Referring to FIG. 1, in the embodiment, the puddle lamp 100 includes a light source 110, a lens set 120, a projection film 130 and a projection lens 140. The above components are described in detail below.

In the embodiment, the puddle lamp 100 only includes one light source 110, and the light source 110 has an optical axis I1 (i.e. first optical axis) and is composed of a single light-emitting body. The light-emitting body is, for example, a Light-Emitting Diode (LED) module that is packaged in various types, a laser diode module that is packaged in various types, a fluorescent lamp, or an electric heating light-emitting element (Lamp), etc., which may output an illumination beam IB. The aforementioned package may include only a single light-emitting chip or a plurality of light-emitting chips. In the embodiment, the light source 110 only includes a white LED module packaged by SMD technology, and the aforementioned white LED module includes a plurality of LED chips with a total rated power of 2 watts or less.

The lens set 120 may be used for receiving and collimating light in the system, which includes at least one or more lenses. The lens in the lens set 120 can be viewed as relay lens. In the embodiment, the lens set 120 has an optical axis I2 (i.e. second optical axis), and includes at least one collimating lens, which may collimate light incident to the collimating lens along a direction of the optical axis I2. In an embodiment, the lens set 120 only includes one lens. In another embodiment, the lens set 120 may include a plurality of lenses, and the number of the lenses is not limited by the invention.

In the embodiment, the projection film 130 may be a device or element adapted to convert the illumination beam IB into an image beam IMB with a fixed and unchangeable pattern, and includes a transmissive fixed image layer. For example, the projection film 130 may be a transparent film carrying a specific pattern or a sheet metal member (for example, a metal plate or a plastic plate, etc.) having light transmitting portions of a specific pattern (for example, hollowed parts or glass, etc.), and none electric power is consumed during a process that the projection film 130 converts the illumination beam IB into the image beam IMB. Namely, the projector 130 is not a light valve that needs to consume power such as DMD, LCD, or LCOS, etc. In the embodiment, the projection film 130 is a transparent film carrying a specific pattern, and when the light passes through the specific pattern, the light is partially absorbed, blocked or reflected, and a part of the light is allowed to pass through to form a pattern. A filter and the projector film 130 have the same functions and characteristics, except that it specifically refers to the projection film 130 that forms a pattern by filtering a part of the light.

The projection lens 140 includes a plurality of lenses having refractive powers. In the embodiment, the projection lens 140 has an optical axis I3, and a front lens set and a rear lens set separated by an aperture are located on the optical axis I3, and the front lens set and the rear lens set respectively include one or more lenses, for example, a combination of one or more lenses with refractive powers. Each of the lenses may be any one of a biconcave lens, a biconvex lens, a concavo-convex lens, a convexo-concave lens, a plano-convex lens and a plano-concave lens. Alternatively, the aperture may also be configured at a light input end or the light output end of the projection lens 140, and the pattern and type of the projection lens 140 are not limited by the invention.

Arrangements and optical effects of the above components are to be described in detail in the following paragraphs.

Referring to FIG. 1, in the embodiment, the lens set 120 is disposed at a light path downstream side of the light source 110. The projection film 130 is disposed at a light path downstream side of the lens set 120. The projection lens 140 is disposed at a light path downstream side of the projection film 130. Since light is transmitted from an upstream side to the downstream side along the light path, the light path downstream side of a device may be regarded as a light path portion after the light passes through the device. For example, regarding the light path downstream side of the light source 110, the light path after the light is emitted from the light source 110 is all referred to as the light path downstream side of the light source 110, and the lens set 120, the projection film 130, the projection lens 140 are all located at the light path downstream side of the light source 110, and the projection film 130 and the projection lens 140 are all located at the light path downstream side of the lens set 120, and the others may be deduced by analogy.

Moreover, the optical axis I1 of the light source 110, the optical axis I2 of the lens set 120, and the optical axis I3 of the projection lens 140 are substantially parallel, and the optical axis I2 of the lens set 120 and the optical axis I3 of the projection lens 140 are coincided with each other (i.e. the lens set 120 and the projection lens 140 are optically coaxial), but the light source 110 and the lens set 120 has a non-zero offset OS in a direction D perpendicular to the optical axis I2, where an absolute value of the offset OS may be within a range of 0.1 mm or more and 0.3, 0.6, 1, 3, 5, 10 mm or less and does not include 0 mm, i.e., the optical axis I1 of the light source 110 and the optical axis I2 of the lens set 120 do not coincide with each other.

Taking the optical axis I2 of the lens set 120 as a reference, when the offset OS is positive, it represents that the optical axis I1 of the light source 110 has the offset OS in an opposite direction of the direction D compared to the optical axis I2 of the lens set 120. Conversely, when the offset OS is negative, it represents that the optical axis I1 of the light source 110 has the non-zero offset OS in the direction D compared to the optical axis I3 of the projection lens 140. In the embodiment, the offset OS is a shift by 0.25 mm in the direction D, i.e. the offset OS is −0.25 mm.

According to another aspect, if the light source 110 is regarded as an optical subsystem S1, the lens set 120 and the projection lens 140 are then regarded as another optical subsystem S2, and the optical axis I1 of the optical subsystem S1 has the non-zero offset OS in the direction D or the opposite direction of the direction D compared with the optical axis I2 (or I3) of the optical subsystem S2.

Referring to FIG. 1, after the illumination beam IB emitted by the light source 110 is transmitted to the lens set 120, after the lens set 120 collimates the illumination beam IB, the illumination light IB is further transmitted to the projection film 130. After the projection film 130 converts the illumination beam IB into the image beam IMB, the projection lens 140 projects the image beam IMB onto a surface of a projection medium PM, and in the embodiment, the projection medium PM is the ground, but the invention is not limited thereto. The surface of the projection medium PM may be regarded as an image plane IS. In the embodiment, in a reference plane (i.e. the plane shown in FIG. 1), a non-zero included angle θ1 (or referred to as a first included angle) is included between the optical axis I3 of the projection lens 140 and the image plane IS, and the offset OS is inversely proportional to the included angle θ1, i.e., the larger the absolute value of the offset OS is, the smaller the absolute value of the corresponding included angle θ1 is, and the better the uniformity improvement effect is. The included angle θ1 is an acute angle less than 90 degrees formed with the optical axis. The abovementioned reference plane is defined as follows. The optical axis I3 of the projection lens 140 intersects with the image plane IS to form a reference point RP, and the reference plane is determined by the optical axis I3 of the projection lens 140, a normal vector on the reference point RP of the image plane IS, and the first reference point RP. The reference plane includes the first, the second and the third optical axes I1, I2, I3.

It should be noted that a part of contents of the aforementioned embodiment is also used in the following embodiment, and descriptions of the same technical contents are omitted. The aforementioned embodiment may be referred for descriptions of the same device names, and detailed descriptions thereof are not repeated in the following embodiment.

Referring to FIG. 2, the puddle lamp 100a of FIG. 2 is substantially similar to the puddle lamp of FIG. 1, and a main difference therebetween is that in the puddle lamp 100a, the optical axis I1 of the light source 110 is not parallel with the optical axis I3 of the projection lens 140, and the optical axis I2 of the lens set 120 and the optical axis I3 of the projection lens 140 are still substantially parallel and coincided with each other (i.e. the lens set 120 and the projection lens 140 are optically coaxial). In detail, the optical axis I1 of the light source 110 is tilted relative to the optical axis I2 of the lens set 120 (or the optical axis I3 of the projection lens 140), and in the reference plane, a non-zero included angle θ2 (or referred to as a second included angle) is included therebetween. The absolute value of the included angle θ2 may be 30, 20 or 10 degrees or less, and in the embodiment, the absolute value of the included angle θ2 is about 20 degrees.

According to another aspect, if the light source 110 is regarded as an optical subsystem S1, the lens set 120 and the projection lens 140 are then regarded as another optical subsystem S2, and the optical axis I1 of the optical subsystem S1 is tilted relative to the optical axis I2 (or I3) of the optical subsystem S2 by an included angle θ2.

Taking the optical axis I2 of the lens set 120 as a reference, when the included angle θ2 is positive, it represents that the optical axis I1 of the light source 110 is rotated relative to the optical axis I2 of the lens set 120 by the included angle θ2 in a clockwise direction. Conversely, when the included angle θ2 is negative, it represents that the optical axis I1 of the light source 110 is rotated relative to the optical axis I2 of the lens set 120 by the included angle θ2 in an anticlockwise direction. In the embodiment, the optical axis I1 of the light source 110 is rotated relative to the optical axis I2 of the lens set 120 by an included angle of 20 degrees in the anticlockwise direction, i.e. included angle θ2 is −20 degrees.

Referring to FIG. 3, the puddle lamp 100b of FIG. 3 is substantially similar to the puddle lamp of FIG. 1, and a main difference therebetween is that in the puddle lamp 100b, the optical axis I1 of the light source 110 is not parallel with the optical axis I3 of the projection lens 140, the optical axis I2 of the lens set 120 is not parallel with the optical axis I3 of the projection lens 140, but the optical axis I1 of the light source 110 and the optical axis I2 of the lens set 120 are still substantially parallel and coincided (i.e. the light source 110 and the lens set 120 are optically coaxial).

According to another aspect, if the light source 110 and the lens set 120 are regarded as an optical subsystem S1, the projection lens 140 is then regarded as another optical subsystem S2. In the reference plane, the optical axis I1 (or I2) of the optical subsystem S1 is tilted relative to the optical axis I3 of the optical subsystem S2 by an absolute value of an included angle θ3 that is less than 30, 20, 10 or 5 degrees. In the embodiment, the included angle θ3 is about 3 degrees.

Figure 4A:
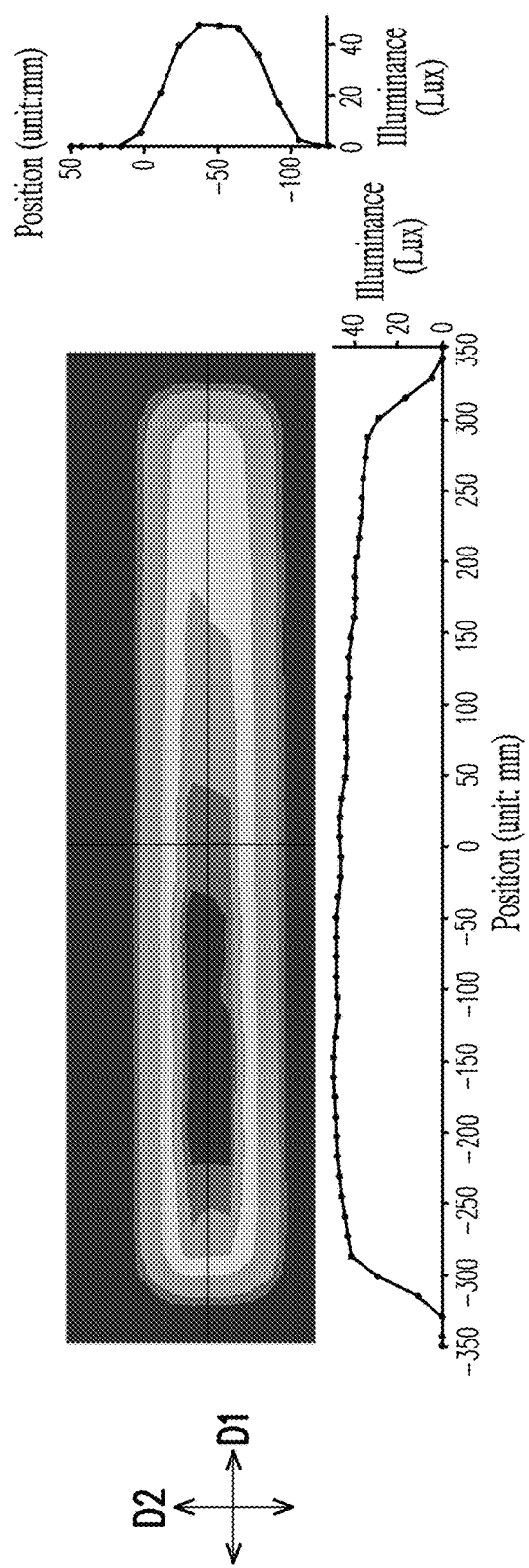
FIG. 4A is an image optical simulation diagram of a puddle lamp of a comparative embodiment.
Figure 4B:
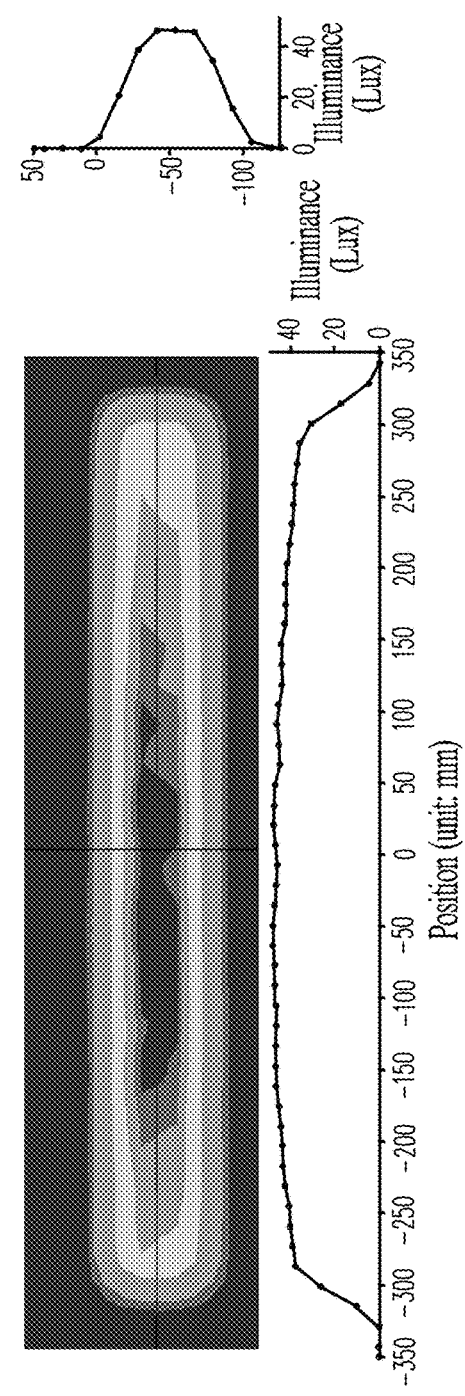
FIG. 4B to FIG. 4D are image optical simulation diagrams of the puddle lamps of the embodiments of FIG. 1 to FIG. 3.
Figure 4C:
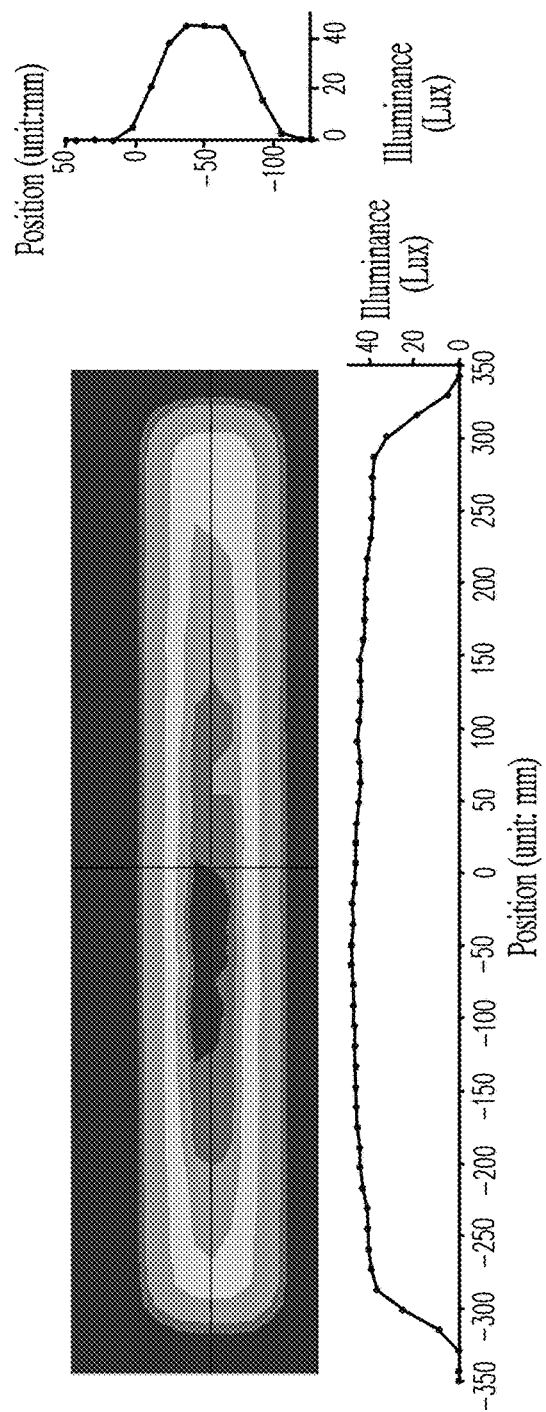
Figure 4D:
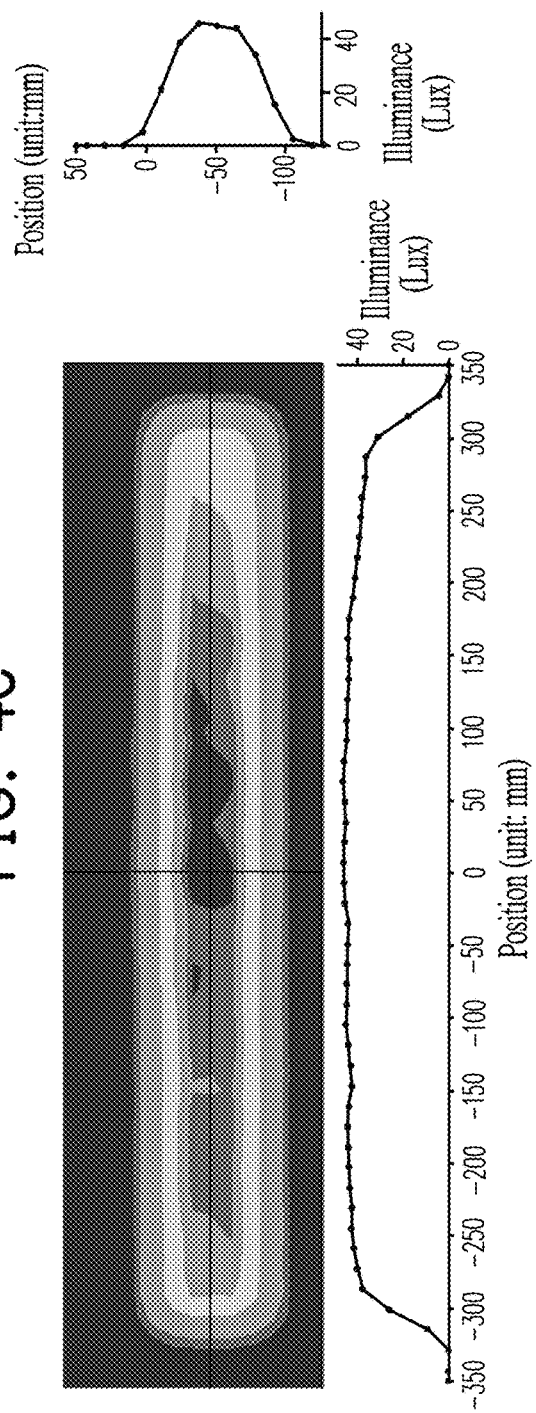

FIG. 4A is an image optical simulation diagram of a puddle lamp of a comparative embodiment. FIG. 4B to FIG. 4D are image optical simulation diagrams of the puddle lamps of the embodiments of FIG. 1 to FIG. 3. In FIG. 4A to FIG. 4D, an image light intensity distribution diagram and a luminance distribution diagram in different directions D1 and D2 are respectively included. In the image light intensity distribution diagram, a darker part is the part with stronger light intensity, while a lighter part is the part with smaller light intensity. In the following paragraphs, optical effects of the puddle lamps 100, 100a and 100b in the above embodiments are described according to FIG. 4A to FIG. 4D.

Referring to FIG. 4A, the puddle lamp of the comparative embodiment (not shown) is substantially similar to the puddle lamp of the embodiment, and a main difference therebetween is that the optical axis of the light source and the optical axis of the lens set of the puddle lamp of the comparative embodiment do not have the offset, and an included angle between the optical axis of the light source, the optical axis of the lens set and the optical axis of the projection lens is 0 degrees (or 180 degrees), i.e. the optical axes of the light source, the lens set and the projection lens are parallel and coincided with each other (i.e. the light source, the lens set and the projection lens are optically coaxial). In the image light intensity distribution diagram of FIG. 4A, it is learned that in the direction D1, the image brightness is more concentrated on a left side of the image, while the image brightness on a right side is smaller, and the image brightness distribution of the puddle lamp of the comparative embodiment is not uniform. Comparatively, in the direction D1, the light intensities of the images of the puddle lamps 100, 100a and 100b are relatively uniform.

On the other hand, in the direction D2, a difference of the image brightness of the puddle lamp of the comparative embodiment is small. However, the image brightness of the puddle lamps 100, 100a and 100b of the embodiment is still more uniform than that of the comparative embodiment in the direction D2.

Referring to FIG. 1, compared to the comparative embodiment, in the puddle lamp 100, the optical axes I1 and I2 of the light source 110, the lens set 120 are substantially parallel, and the optical axis I1 of the light source 110 and the optical axis I2 of the lens set 120 have the non-zero offset OS in the direction D parallel to the optical axis. Referring to FIG. 2 and FIG. 3, compared to the comparative embodiment, in the puddle lamps 100a, 100b, the optical axis I1 of the light source 110 is not parallel with the optical axis I3 of the projection lens 140, where in the puddle lamp 100a of FIG. 2, the optical axis I1 of the light source 110 and the optical axis I2 of the lens set 120 are designed to be tilted with each other to include a non-zero included angle θ2 therebetween. In the puddle lamp 100b of FIG. 3, the optical axis I1 of the light source 110 and the optical axis I2 of the lens set 120 are designed to be parallel and coincided but include the non-zero included angle θ3 with the optical axis I3 of the projection lens 140. In the above designs, geometric asymmetry is introduced into the optical systems of the puddle lamps 100, 100a and 100b, and when the illumination beam IB passes through the lens set 120 and the projection lens 140 with the different configurations described above, even if the distances between the puddle lamps 100, 100a, 100b and the projection medium PM are different (i.e., distance asymmetry), through the above introduced geometric asymmetry, a larger proportion of the illumination beam IB may be directed to the projection medium PM at a greater distance, while a smaller proportion of the illumination beam IB may be directed to the projection medium PM at a closer distance, to cause optical asymmetry, which makes it possible to project an image with a uniform brightness on the projection medium PM.

Namely, in the puddle lamps 100, 100a, 100b of the embodiments of the present invention, optical asymmetry is introduced in the form of an offset or tilt, thereby balancing the asymmetry of the distances between the puddle lamps 100, 100a, 100b and the projection medium PM, so as to project images with a uniform brightness.

In summary, in the puddle lamp of an embodiment of the invention, the optical axes of the light source and the lens set are substantially parallel, and the optical axis of the light source and the optical axis of the lens set have an offset in a direction parallel to the optical axis. In the puddle lamp of another embodiment, the optical axis of the light source is not parallel with the optical axis of the lens set and the optical axis of the projection lens. Even if the distances between the puddle lamp and the projection medium are different, through the above configuration, the puddle lamp may project an image with a uniform brightness on the projection medium.

What is claimed is:

1. A puddle lamp, comprising:
   a light source, composed of a single light-emitting body;
   a lens set, disposed at a light path downstream side of the light source;
   a filter, having a fixed image, and disposed at a light path downstream side of the lens set; and
   a projection lens, disposed at a light path downstream side of the filter,
   wherein,
   in a reference plane, a first optical axis of the light source is substantially parallel with a second optical axis of the lens set, and a third optical axis of the projection lens is not perpendicular to an image plane of the puddle lamp, the light source and the lens set have an offset in a direction perpendicular to the second optical axis, wherein the third optical axis intersects with the image plane to form a reference point, and the reference plane is determined by the third optical axis of the projection lens, a normal vector on the reference point of the image plane, and the reference point, wherein the reference plane further comprises the first optical axis, the second optical axis and the third optical axis.

2. The puddle lamp as claimed in claim 1, wherein a range of an absolute value of the offset is in a range from 0.1 mm to 10 mm and does not include 0 mm.

3. The puddle lamp as claimed in claim 1, wherein,
in the reference plane, the third optical axis of the projection lens and the image plane include a first included angle less than 90 degrees.

4. The puddle lamp as claimed in claim 3, wherein the smaller an absolute value of the first included angle is, the greater an absolute value of the offset is.

5. The puddle lamp as claimed in claim 1, wherein the lens set comprises at least one collimating lens.

6. The puddle lamp as claimed in claim 1, wherein the light source emits an illumination beam, the illumination beam penetrates the lens set and transmits to the projection film, the projection film converts the illumination beam into an image beam, wherein the image beam penetrates the projection lens and forms an image on the image plane.

7. The puddle lamp as claimed in claim 1, wherein the lens set and the projection lens are optically coaxial.

8. The puddle lamp as claimed in claim 1, wherein the first optical axis of the light source has the offset with respect to the second optical axis of the lens set on a positive direction or a negative direction of the direction perpendicular to the second optical axis.

9. The puddle lamp as claimed in claim 1, wherein in the reference plane, the first optical axis of the light source, the second optical axis of the lens set, and the third optical axis of the projection lens are substantially parallel.

10. A puddle lamp, comprising:
a light source, composed of a single light-emitting body;
a lens set, disposed at a light path downstream side of the light source;
a projection film, which is a transmissive fixed image layer, disposed at a light path downstream side of the lens set; and
a projection lens, disposed at a light path downstream side of the projection film,
wherein,
in a reference plane, a first optical axis of the light source is not parallel with a third optical axis of the projection lens, wherein the third optical axis of the projection lens intersects with the image plane to form a reference point, the reference plane is determined by the third optical axis of the projection lens, a normal vector on the reference point of the image plane, and the reference point, wherein the reference plane comprises the first optical axis and the third optical axis.

11. The puddle lamp as claimed in claim 10, wherein in the reference plane, the third optical axis of the projection lens is not perpendicular to an image plane of the puddle lamp.

12. The puddle lamp as claimed in claim 11, wherein the third optical axis of the projection lens and the image plane include a first included angle, and the first included angle is smaller than 90 degrees.

13. The puddle lamp as claimed in claim 10, wherein in the reference plane, the first optical axis of the light source is not parallel with the second optical axis of the lens set,
wherein, in the reference plane, the first optical axis of the light source and the second optical axis of the lens set include a second included angle, and an absolute value of the second included angle is less than or equal to 30 degrees and does not include 0 degrees,
wherein the reference plane further comprises the second optical axis.

14. The puddle lamp as claimed in claim 13, wherein the lens set and the projection lens are optically coaxial.

15. The puddle lamp as claimed in claim 13, wherein a direction of the second include angle is clockwise direction with respect to the second optical axis.

16. The puddle lamp as claimed in claim 13, wherein a direction of the second include angle is anticlockwise direction with respect to the second optical axis.

17. The puddle lamp as claimed in claim 10, wherein the first optical axis of the light source is parallel with a second optical axis of the lens set, wherein the reference plane further comprises the second optical axis.

18. The puddle lamp as claimed in claim 17, wherein in the reference plane, the light source and the lens set are optically coaxial, and the first optical axis of the light source is not parallel with the third optical axis of the projection lens.

19. The puddle lamp as claimed in claim 10, wherein in the reference plane,
the first optical axis of the light source and the third optical axis of the projection lens include a third included angle, and an absolute value of the third included angle is less than or equal to 30 degrees and does not include 0 degrees.

20. The puddle lamp as claimed in claim 10, wherein the light source emits an illumination beam, the illumination beam penetrates the lens set and transmits to the projection film, the projection film converts the illumination beam into an image beam, wherein the image beam penetrates the projection lens and forms an image on the image plane.

* * * * *